(12) United States Patent
Shimasaki et al.

(10) Patent No.: US 8,151,741 B2
(45) Date of Patent: Apr. 10, 2012

(54) CONTROL DEVICE OF INTERNAL COMBUSTION ENGINE

(75) Inventors: Yuichi Shimasaki, Saitama (JP); Hajime Kabashima, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 440 days.

(21) Appl. No.: 12/400,297

(22) Filed: Mar. 9, 2009

(65) Prior Publication Data

US 2009/0229541 A1 Sep. 17, 2009

(30) Foreign Application Priority Data

Mar. 12, 2008 (JP) ................................. 2008-062615

(51) Int. Cl.
*F02B 43/08* (2006.01)
(52) U.S. Cl. ........................................ 123/3; 123/304
(58) Field of Classification Search .............. 123/3, 304; 60/286
See application file for complete search history.

(56) References Cited

U.S. PATENT DOCUMENTS

| | | | |
|---|---|---|---|
| 6,845,610 B2 * | 1/2005 | Shiino et al. ................... | 60/286 |
| 7,121,254 B2 * | 10/2006 | Wickman et al. .............. | 123/304 |
| 7,188,607 B2 * | 3/2007 | Kobayashi ..................... | 123/299 |
| 7,421,999 B2 * | 9/2008 | Kim et al. ...................... | 123/304 |
| 7,769,527 B2 * | 8/2010 | Noda et al. ..................... | 123/300 |

FOREIGN PATENT DOCUMENTS

| | | |
|---|---|---|
| JP | 2001-254640 A | 9/2001 |
| JP | 2003-532828 A | 11/2003 |
| JP | 2003-532829 A | 11/2003 |
| JP | 2004-190586 A | 7/2004 |
| WO | WO 01/86127 A2 | 11/2001 |
| WO | WO 01/86128 A2 | 11/2001 |

\* cited by examiner

*Primary Examiner* — Noah Kamen
(74) *Attorney, Agent, or Firm* — Arent Fox LLP

(57) ABSTRACT

A control device for a premixed charge compression ignition (PCCI) internal combustion engine is provided, capable of stable operation over a wide operating range. The control device of an engine 1 comprises: a fuel supply means 20 of supplying the main fuel to the engine 1; an hydrogen supply means 30 of supplying reformed gas containing hydrogen; a fuel supply control unit 41 of controlling an injection timing and an injection period of the main fuel supplied from the injector 22 of the fuel supply means 20 based on the PCCI combustion condition of the engine 1; and a hydrogen supply control unit 42 of controlling an injection timing and an injection period of reformed gas from the gas injector 32 of the hydrogen supply means 30 based on the PCCI combustion condition.

5 Claims, 6 Drawing Sheets

CONTROL DEVICE OF INTERNAL COMBUSTION ENGINE

This application is based on and claims the benefit of priority from Japanese Patent Application No. 2008-062615, filed on 12 Mar. 2008, the content of which is incorporated herein by reference.

BACKGROUND OF THE INVENTION

1. Field of the Invention

The present invention relates to a control device of an internal combustion engine, in particular, to a control device of a premixed charge compression ignition (PCCI) internal combustion engine capable of stable operation over a wide operating range.

2. Related Art

Conventionally, a diffusion combustion system used for a diesel engine compresses air drawn into a combustion chamber, and then injects fuel into this compressed air to cause self-ignition, thereby causing combustion. Such a diesel engine has thermal efficiency superior to that of a gasoline engine. However, since there locally exists an excessive fuel concentration region and a high temperature region due to non-uniformly atomized fuel distribution, the amount of NOx and particulate matter (herein after referred to as "PM") emissions is high, which results in the load placed on an exhaust-gas aftertreatment system of exhaust being large.

In view of this problem, recently, the premixed charge compression ignition has received attention with the aim of considerably reducing the emission amounts of NOx and PM while maintaining fuel efficiency. With the premixed charge compression ignition, in contrast to the above-mentioned diffuse combustion, compression ignition is caused of a premixed air-fuel mixture that is diluted during a long ignition retarding period.

FIG. 9 is a diagram illustrating regions of PM and NOx generation in relation to a local temperature and a local equivalence ratio. As shown in FIG. 9, PM is generated due to oxygen deprivation in a region where the local equivalence ratio is high (fuel is excessively concentrated), and NOx is generated in a region where the local equivalence ratio is low and the local temperature is high.

As shown by the dashed line 9a, in the conventional diffusion combustion, the combustion occurs over both regions of PM and NOx generation by compression ignition of non-uniformly atomized fuel. On the other hand, as shown by the solid line 9b, in the premixed charge compression ignition combustion, by compression ignition of the diluted premixed air-fuel mixture, regions of excessive fuel concentration and regions of high temperature are few compared with conventional diffusion combustion, and the generated amount of PM and the NOx can be reduced.

Various studies have been made recently on such a premixed charge compression ignition engines. For example, in Patent Documents 1 and 2, for the purpose of further improving fuel efficiency and exhaust emissions, it is proposed that an engine is provided with a mixing device that mixes a first fuel with intake air to supply a premixed air-fuel mixture, and an injector that injects a second fuel directly into a combustion chamber. In this engine, the second fuel is injected directly into the combustion chamber after the premixed air-fuel mixture has ignited in the combustion chamber. Furthermore, in Patent Documents 1 and 2, combinations of fuels such as natural gas, gasoline, light oil, naphtha, and propane are exemplified as the first fuel and the second fuel.

[Patent Document 1] Japanese Translations of PCT International Publication, Publication No. 2003-532828
[Patent Document 2] Japanese Translations of PCT International Publication, Publication No. 2003-532829

SUMMARY OF THE INVENTION

However, in the above-mentioned premixed charge compression ignition internal combustion engine, there has been a problem in that noise and vibration increase due to instantaneous combustion in moderate and high load regions.

This problem can be measurably improved by using a high cetane number fuel and retarding the fuel injection timing from the standard injection timing of the internal combustion engine. However, in the technique for retarding fuel injection timing, it has been known that the fuel efficiency and the stability of ignition and combustion deteriorates substantially. In the premixed charge compression ignition internal combustion engine, the combustion system is limited only to a low load operation region under present circumstances due to the above-mentioned problem in moderate and high operating regions.

The present invention was accomplished in view of the foregoing problems, and has an objective thereof to provide a control device of a premixed charge compression ignition internal combustion engine capable of stable operation over a wide operating region.

In order to achieve the above-mentioned objective, the present invention provides a control device for a premixed charge compression ignition internal combustion engine (1) using light oil or a composite fuel of light oil and other fuels as main fuel and conducting compression ignition of the main fuel in a combustion chamber. The control device of the internal combustion engine includes a fuel supply means (20) for supplying the main fuel to the engine; a hydrogen supply means (30) for supplying gas containing hydrogen to the engine; a fuel supply control means (40, 41) for controlling supply timing and a supply period of the main fuel by way of the fuel supply means, based on the premixed charge compression ignition combustion conditions of the engine; and a hydrogen supply control means (40, 42) for controlling supply timing and a supply period of gas containing hydrogen by way of the hydrogen supply means based on the premixed charge compression ignition combustion conditions of the engine.

According to this configuration, while gas containing hydrogen is being supplied to the engine, the main fuel is combusted based on the premixed charge compression ignition combustion condition. In this case, the supply timing and the supply period of gas containing hydrogen are controlled based on the premixed charge compression ignition combustion conditions of the engine, while the supply timing and the supply period of the main fuel are being controlled based on the premixed charge compression ignition combustion condition of the engine.

Accordingly, even in a case where the supply timing of the main fuel is retarded from the standard injection timing of the engine, for example, the combustion is made gradual with shortening ignition retarding, in addition to reducing noise and vibration. Therefore, as described above, combustion in moderate and high load regions can be improved, and the operating region can be expanded. In addition, it is possible to also reduce the emission amounts of CO and unburnt HC. In this way, exhaust emissions and the main fuel consumption can be further improved.

Preferably, the hydrogen supply means is provided with a reformed gas generation means (31) for generating gas containing hydrogen by reforming the main fuel.

According to this configuration, the main fuel is reformed to generate gas containing hydrogen, and then this gas can be supplied to the engine.

Preferably, the above-mentioned fuel supply means is provided with a fuel injector (22) that injects the main fuel into the engine. The hydrogen supply means is provided with a gas injector (32) that injects gas containing hydrogen into the intake air of the engine.

According to this configuration, by way of injecting the main fuel and gas containing hydrogen by the fuel injector and the gas injector inject, the supply timing and the supply period of these main fuel and gas can be controlled accurately. In particular, in order to establish stable combustion in the premixed charge compression ignition internal combustion engine, it is necessary to control the supply timing and the supply period of the main fuel and gas accurately.

Preferably, the reformed gas generation means generates gas containing hydrogen by way of one kind of a reaction selected from the group consisting of a steam reforming process, a partial oxidation process, a carbon dioxide reforming process, and an auto-thermal process in which the steam reforming process and the partial oxidation process are combined.

According to this configuration, hydrogen gas can be stably generated by way of one kind of reaction selected from the group consisting of a steam reforming process, a partial oxidation process, a carbon dioxide reforming process, and a auto-thermal process in which the steam reforming process and the partial oxidation process are combined, whereby a gas containing hydrogen is generated.

Preferably, the reforming reaction of the main fuel by the reformed gas generation means is conducted under an atmosphere of air, oxygen-enriched air, nitrogen-enriched air, oxygen, nitrogen, carbon dioxide, and water vapor.

According to this configuration, hydrogen can be stably generated by way of the reforming reaction under an atmosphere of air, oxygen-enriched air, nitrogen-enriched air, oxygen, nitrogen, carbon dioxide, and water vapor, whereby gas containing hydrogen is generated.

DETAILED DESCRIPTION OF THE INVENTION

Figure 1:
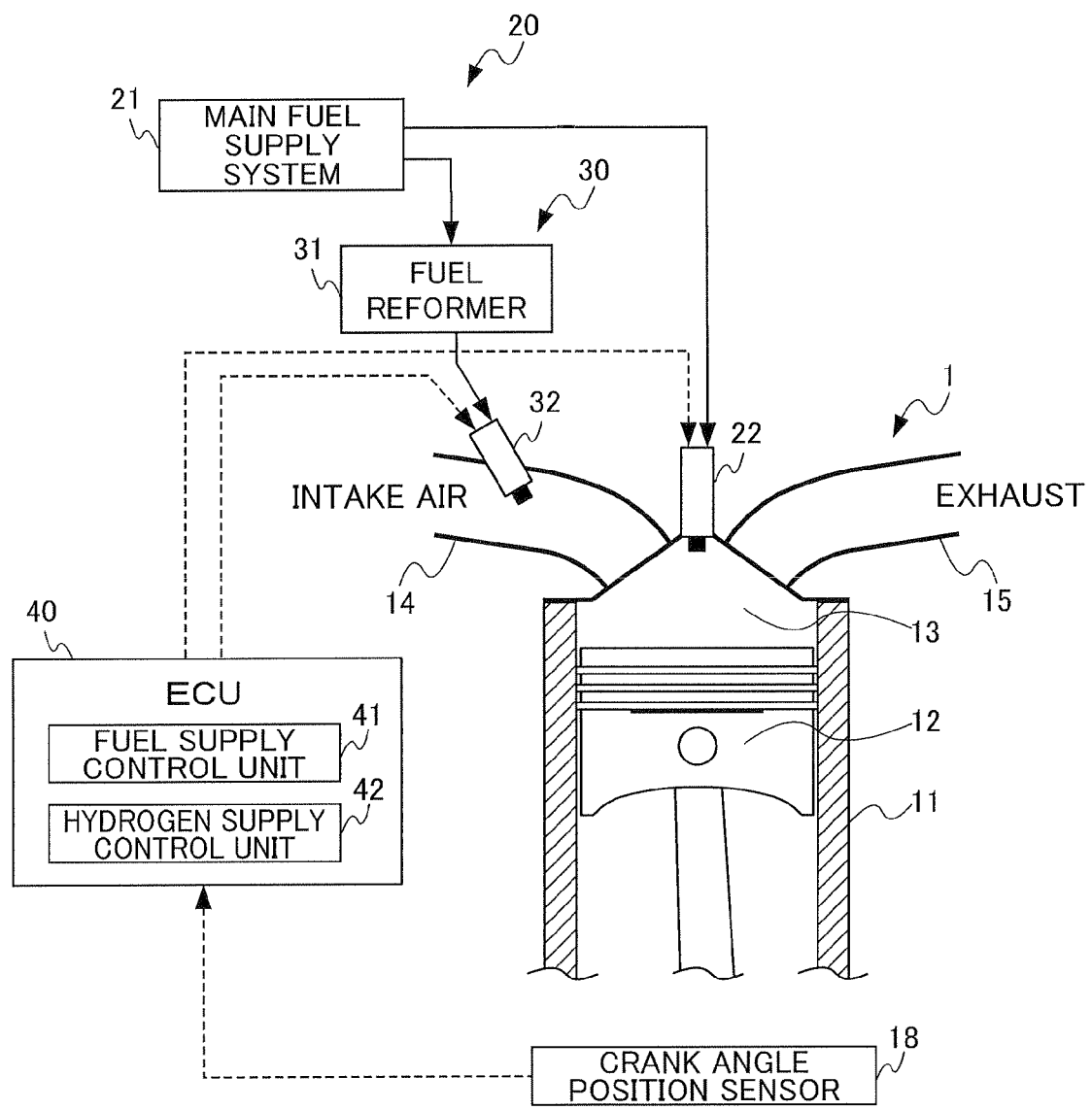
FIG. 1 is a diagram illustrating the structure of the internal combustion engine and a control device thereof according to one embodiment of the present invention.

FIG. 1 is a diagram illustrating the structure of the internal combustion engine and the control device thereof according to one embodiment of the present invention. The internal combustion engine 1 (hereinafter referred to as "engine") is a premixed charge compression ignition (hereinafter referred to as "PCCI") internal combustion engine that causes compression ignition within the combustion chamber 13, which is formed in the cylinder 11, by a piston 12. It should be noted that FIG. 1 shows only one of a plurality of cylinders in the engine 1. This engine 1 is provided with a fuel supply means 20 that supplies the main fuel and a hydrogen supply means 30 that supplies gas containing hydrogen.

The fuel supply means 20 is configured to include a main fuel supply system 21 that supplies the main fuel and a fuel injector 22 that supplies the main fuel supplied from the main fuel supply system 21.

The main fuel supply system 21 is provided with a fuel tank that stores the main fuel; and a fuel supply mechanism that supplies the main fuel inside the fuel tank to a fuel injector 22 and a fuel reformer 31 of a hydrogen supply means 30. Here, light oil, a composite fuel of light oil and other fuels, or the like is used as the main fuel. In addition, the above-mentioned other fuels includes biofuel, GTL fuel, and the like. The light oil and the GTL fuel include hydrocarbons such as alkanes, alkenes, alkynes, aromatic compounds, alcohols, aldehydes, and esters. The biofuel includes hydrocarbons such as ethanol and aliphatic acid methyl ester.

The fuel injector 22 is provided in the cylinder 11 of the engine 1, and injects the main fuel directly into a combustion chamber 13. The fuel injector 22 is electrically connected with an electronic control unit 40 (hereinafter referred to as "ECU"), and operates based on a control signal output from the ECU 40.

The hydrogen supply means 30 is provided with the fuel reformer 31 that reforms the main fuel to generate reformed gas containing hydrogen, and a gas injector 32 that supplies reformed gas generated by the fuel reformer 31.

The fuel reformer 31 is provided with a reforming catalyst, and reforms the main fuel supplied from the main fuel supply system 21 under an atmosphere of air, oxygen-enriched air, nitrogen-enriched air, oxygen, nitrogen, carbon dioxide, and water vapor to generate reformed gas including hydrogen, and then supplies this reformed gas to the gas injector 32. Here, it is preferred that the reforming reaction on the reforming catalyst is a kind of reaction selected from the group consisting of, for example, a steam reforming process, a partial oxidation process, a carbon dioxide reforming process, and a auto-thermal process in which the steam reforming process and the partial oxidation process are combined.

The gas injector 32 is provided in intake plumbing 14 of the engine 1, and injects reformed gas into the intake air of engine 1. This gas injector 32 is electrically connected with the ECU 40, and operates based on a control signal output from the ECU 40.

In addition, the engine 1 is provided with a crank angle position sensor 18 that detects the rotation angle of a crankshaft, which is not shown in this figure. The crank angle position sensor 18 generates a pulse at every one degree of crank angle, and a signal of the pulse is supplied to the ECU 40. Furthermore, the crank angle position sensor 18 generates a cylinder identification pulse at a prescribed crank angle position of a specific cylinder, and supplies it to the ECU 40.

The ECU 40 is provided with an input circuit having a function of shaping an input signal waveform from various sensors, correcting a voltage level into a prescribed level, converting an analog signal value into a digital signal value, and the like; and a central operation processing unit (hereinafter referred to as "CPU"). Furthermore, the ECU 40 is provided with a memory circuit that stores various operation programs to be executed by the CPU, operation results, and the like; and an output circuit that outputs a control signal to the fuel supply means 20 and the hydrogen supply means 30.

In addition, the ECU 40 is provided with a plurality of control blocks that function by way of the hardware configuration of the input circuit, the CPU, the memory circuit, and the output circuit. More specifically, the ECU 40 is provided with a fuel supply control unit 41 that controls the fuel injector 22 of the fuel supply means 20, and the hydrogen supply control unit 42 that controls the gas injector 32 of the hydrogen supply means 30.

The fuel supply control unit 41 performs the operations relating to the appropriate main fuel injection timing and main fuel injection period in accordance with the output of the crank angle position sensor 18, based on the PCCI combustion conditions established beforehand for executing PCCI combustion in the engine 1, and then controls the fuel injector 22 based on the injection timing and injection period.

The hydrogen supply control unit 42 performs the operations relating to the appropriate reformed gas injection timing and reformed injection period in accordance with the output of the crank angle position sensor 18, based on the above-mentioned PCCI combustion condition, and then controls the gas injector 32 based on the injection timing and injection period.

Next, as in the above-mentioned embodiment, the effectiveness of adding hydrogen contained in reformed gas to the intake air in PCCI combustion is verified. Hereinafter, an example is made in which a predetermined amount of hydrogen is added to the intake air under predetermined main fuel injection timing, and this example is compared to a comparative example in which no hydrogen is added. Here, the difference between the example and the comparative example is only the existence or nonexistence of hydrogen addition, and the characteristic of the engine, the kind of main fuel, the main fuel injecting conditions, and the like are all the same.

Figure 2:
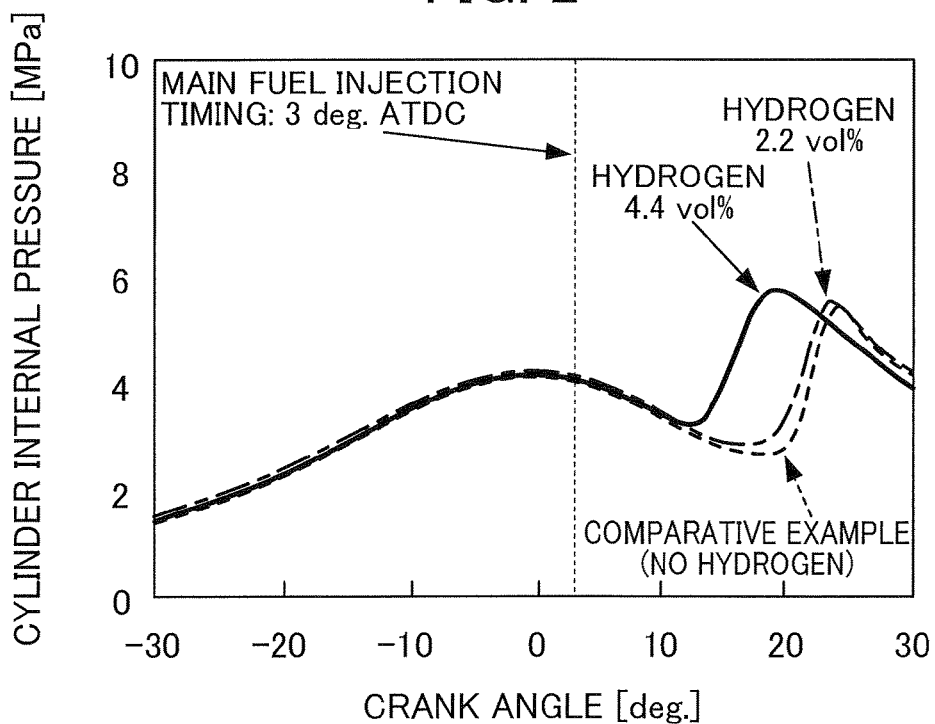
FIG. 2 is a graph illustrating the relationship between a cylinder internal pressure and a crank angle according to an example and a comparative example of the present invention.

FIG. 2 is a graph illustrating the relationship between cylinder internal pressure and crank angle according to the example and the comparative example of the present invention.

Figure 3:
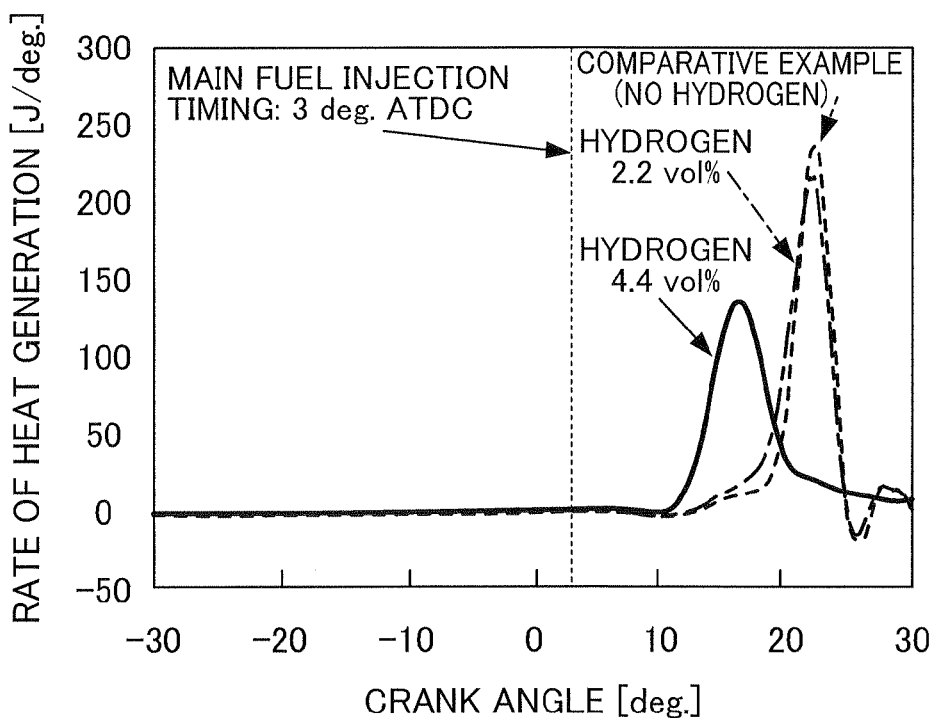
FIG. 3 is a graph illustrating the relationship between a rate of heat generation and a crank angle according to the example and the comparative example of the present invention.

FIG. 3 is a graph illustrating the relationship between a rate of heat generation and crank angle according to the example and the comparative example. In these FIGS. 2 and 3, the dashed line represents the results of the comparative example, the alternating long and short dash line represents the results for a case where 2.2 vol % of hydrogen is added to the intake air in the example, and the solid line represents the result for a case where 4.4 vol % of hydrogen is added to the intake air in the example.

In the examples illustrated in FIGS. 2 and 3, a case is shown where the main fuel injection timing is retarded past standard injection timing (e.g., top dead center). As described above, establishing the PCCI combustion in a moderate and high load region requires carrying out injection in which the fuel injection timing is retarded past the standard injection timing (herein after referred to as "ATDC" (After Top Dead Center)). In particular, in the examples show in FIGS. 2 and 3, the fuel injection timing was set to +3 degrees ATDC.

As shown in FIGS. 2 and 3, comparing cases in which hydrogen is added with hydrogen not added, the period from the main fuel injection to ignition (the period from the main fuel injection timing to the time when the cylinder internal pressure and the rate of heat generation reach a peak), that is, ignition retard shortens. In particular, ignition retard shortens in a case where 4.4 vol % of hydrogen is added, compared with a case where 2.2 vol % of the hydrogen is added. More specifically, ignition retard shortens by about 6 degree in the case where 4.4 vol % of hydrogen is added, compared with no hydrogen added. As a result, as shown in FIG. 3, heat generation accelerates, change of the rate of heat generation becomes moderate, the degree of constant volume improves, and the thermal efficiency becomes high when hydrogen is added.

At this point, the cause to achieve the above-mentioned effect is examined. As described above, there is a particularly significant effect in the case where 4.4 vol % of hydrogen provides is added. This may be caused by the fact that the air-fuel ratio flammability lower limit of hydrogen is 4%. Therefore, it is considered that static electricity and plasma generated by injecting the main fuel ignites hydrogen earlier than the main fuel when hydrogen of at least this air-fuel ratio flammability limit is added, so that ignition retard of the main fuel can be shortened for efficient combustion.

Figure 4:
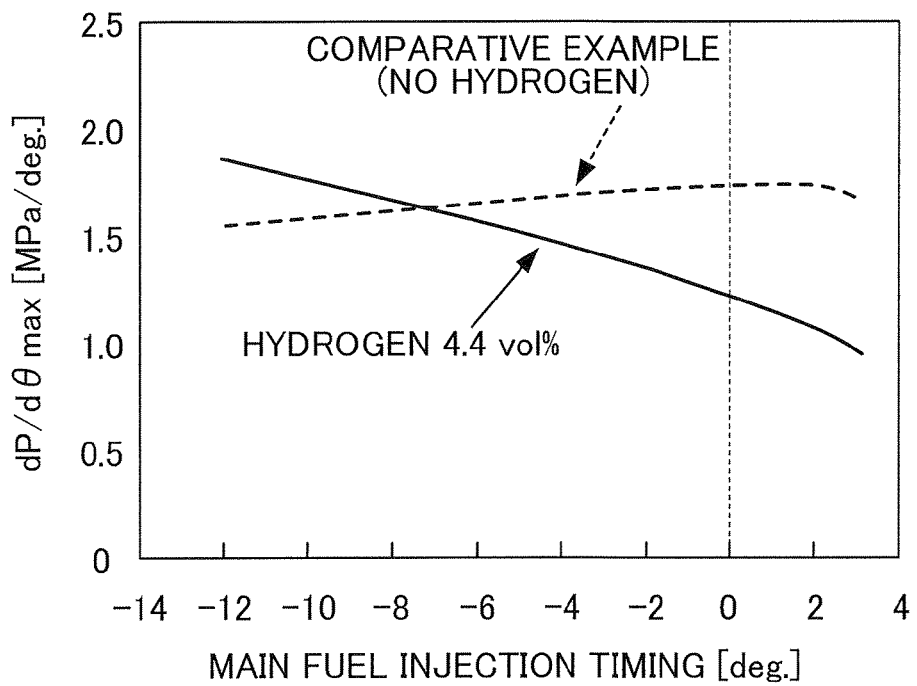
FIG. 4 is a graph illustrating the relationship between dP/dθmax and main fuel injection timing according to the example and the comparative example of the present invention.

FIG. 4 is a graph illustrating the relationship between dP/dθmax and main fuel injection timing according to the example and the comparative example. More specifically, this figure illustrates changes in dP/dθmax of the example and the comparative example when the main fuel injection timing is changed from −14 degrees ATDC to +4 degrees ATDC. In addition, in FIG. 4, the dashed line represents the results of the comparative example, and the solid line represents the results of the example in which 4.4 vol % of hydrogen is added. The dP/dθmax indicates the maximum rate of pressure rise (dP/dθ) of the cylinder internal pressure per unit crank angle detected in one combustion cycle, which is to be an indication of noise and vibration generated in the engine.

In the comparative example, the dP/dθmax is approximately constant regardless of the main fuel injection timing. On the other hand, in the example, the dP/dθmax is smaller as the main fuel injection timing is retarded. In particular, when the main fuel injection timing is retarded past 0 degrees ATDC, the dP/dθmax in the example is substantially smaller than that in the comparative example. Therefore, it is demonstrated that noise and vibration are reduced, especially by adding hydrogen under ATDC injection.

Figure 5:
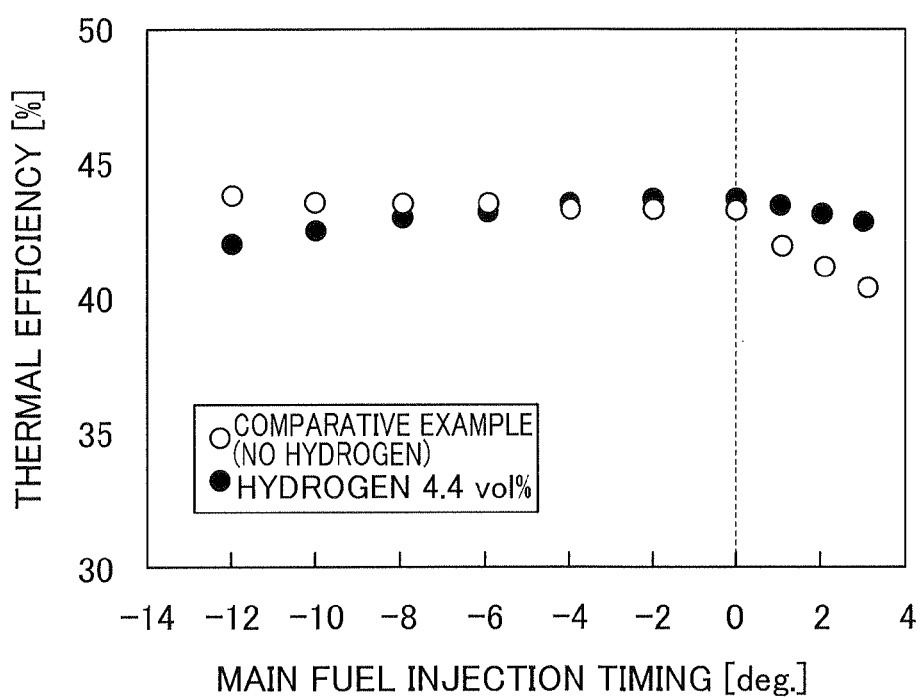
FIG. 5 is a graph illustrating the relationship between thermal efficiency and main fuel injection timing according to the example and the comparative example of the present invention.

FIG. 5 is a graph illustrating the relationship between thermal efficiency and main fuel injection timing according to the example and the comparative example. More specifically, this figure illustrates changes in thermal efficiency when the main fuel injection timing is changed from −14 degrees ATDC to +4 ATDC degrees. In addition, in FIG. 5, the white dots represent the results of the comparative example, and the black dots represent the result of the example in which 4.4 vol % of hydrogen is added.

In the comparative example, the thermal efficiency is substantially constant between −14 and 0 degrees ATDC of the main fuel injection timing, but decreases rapidly after 0 degrees ATDC. On the other hand, in the example, the thermal efficiency is substantially constant regardless of the main fuel injection timing, in particular, higher than that of the comparative example after 0 degrees ATDC.

As described in detail referring to FIGS. 2 and 3, when ATDC injection is carried out, instantaneous combustion occurs, and the thermal efficiency rapidly deteriorates in the case of the no additional hydrogen. On the other hand, the addition of hydrogen under ATDC injection can cause gradual combustion for achieving effective combustion.

Figure 6:
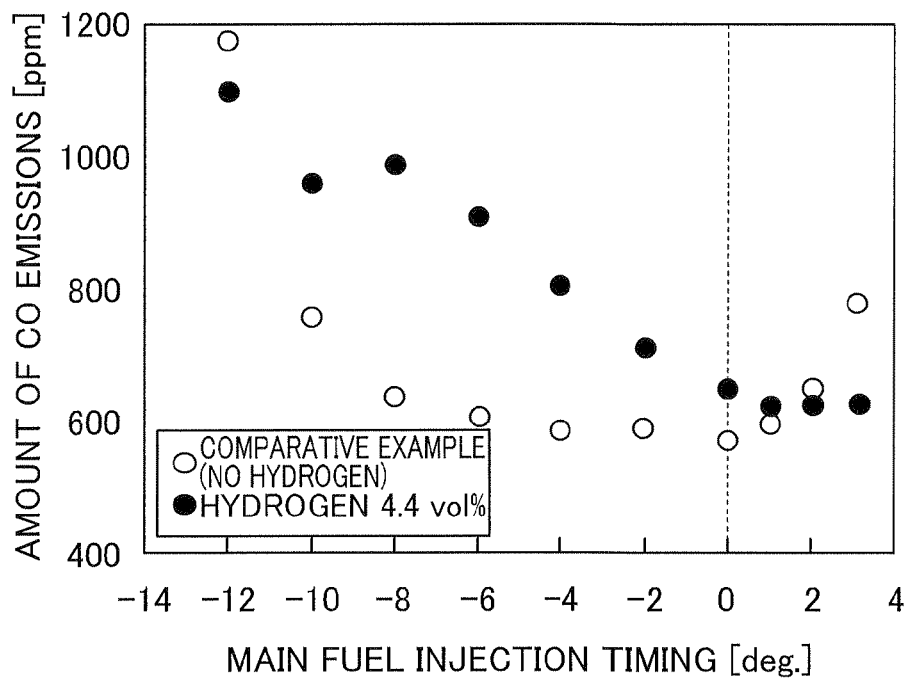
FIG. 6 is a graph illustrating the relationship between an amount of CO emissions and main fuel injection timing according to the example and the comparative example of the present invention.

FIG. 6 is a graph illustrating the relationship between an amount of CO emissions and main fuel injection timing according to the example and the comparative example.

Figure 7:
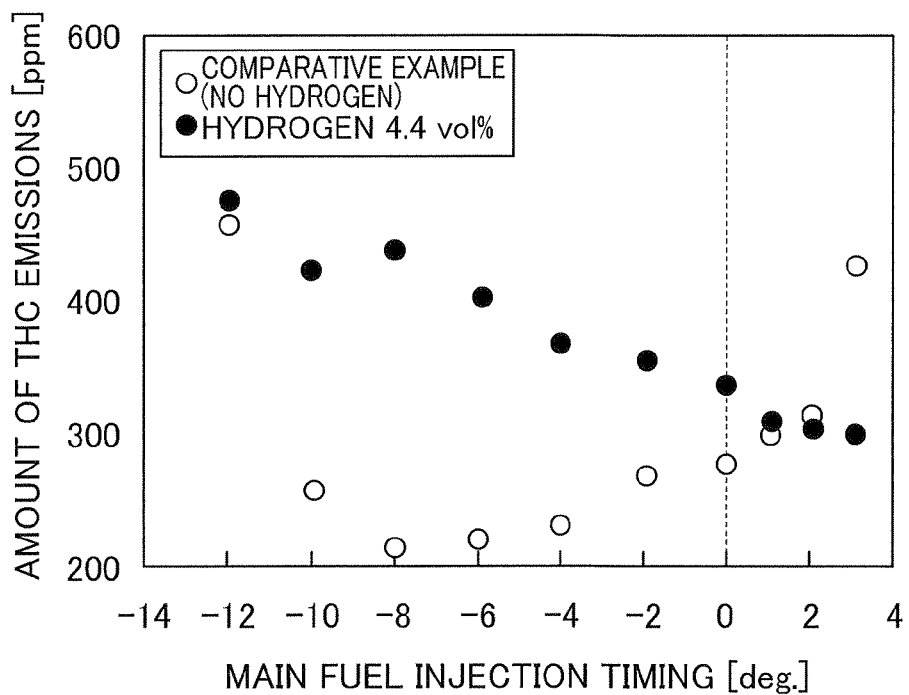
FIG. 7 is a graph illustrating the relationship between an amount of THC emissions and main fuel injection timing according to the example and the comparative example of the present invention.

FIG. 7 is a diagram illustrating the relationship between an amount of THC emissions (total amount of unburnt hydrocarbon) and main fuel injection timing according to the examples and the comparative examples. More specifically, FIGS. 6 and 7 illustrate changes in an amount of CO emissions and an amount of THC emissions, respectively, in a case where the main fuel injection timing is changed from −14 degrees ATDC to +4 degrees ATDC. In addition, in FIGS. 6 and 7, the white dots represent the results of the comparative example, and the black dots represent the results of the example in which 4.4 vol % of hydrogen is added.

In the comparative example, both the amount of CO emissions and the amount of THC emissions increase when the ATDC injection is conducted. On the other hand, in the example, both the amount of CO emissions and the amount of THC emissions decrease, and even become less than those in the comparative example, respectively, as the main fuel injection timing is retarded under the ATDC injection.

Figure 8:
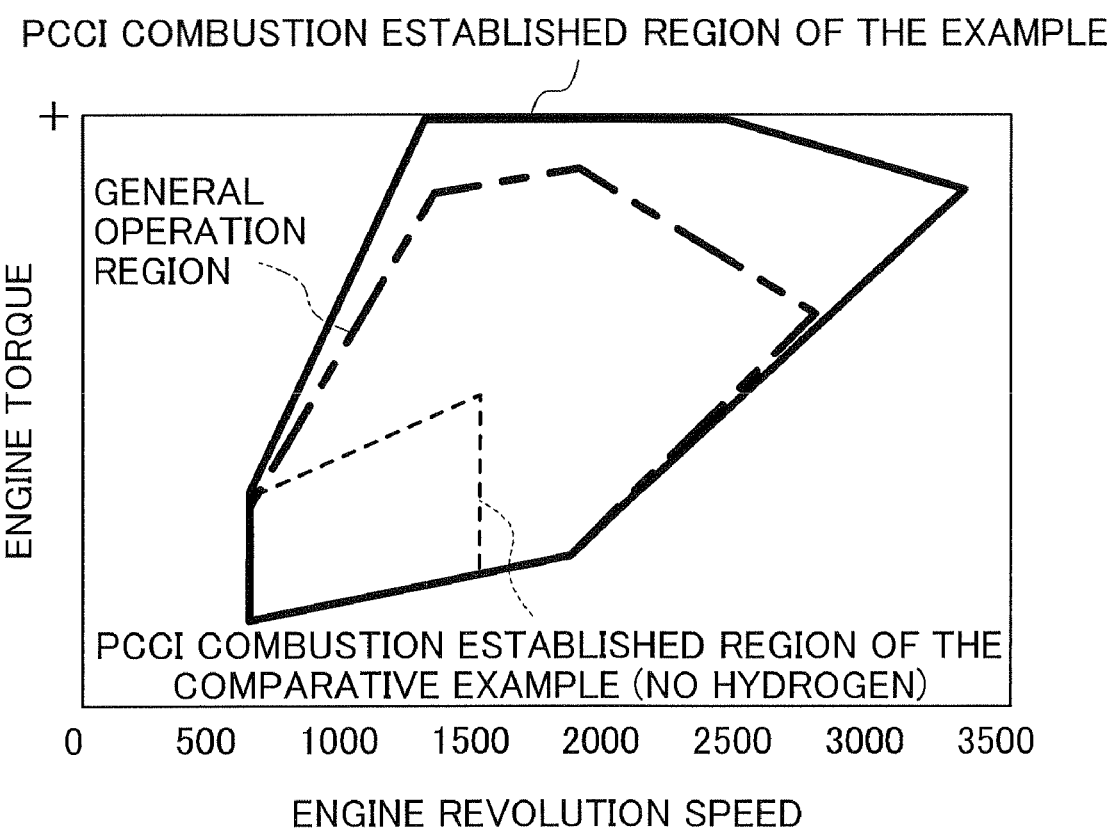
FIG. 8 is a graph illustrating PCCI combustible regions in relation to engine revolution speed and engine torque according to the example and the comparative example of the present invention.
Figure 9:
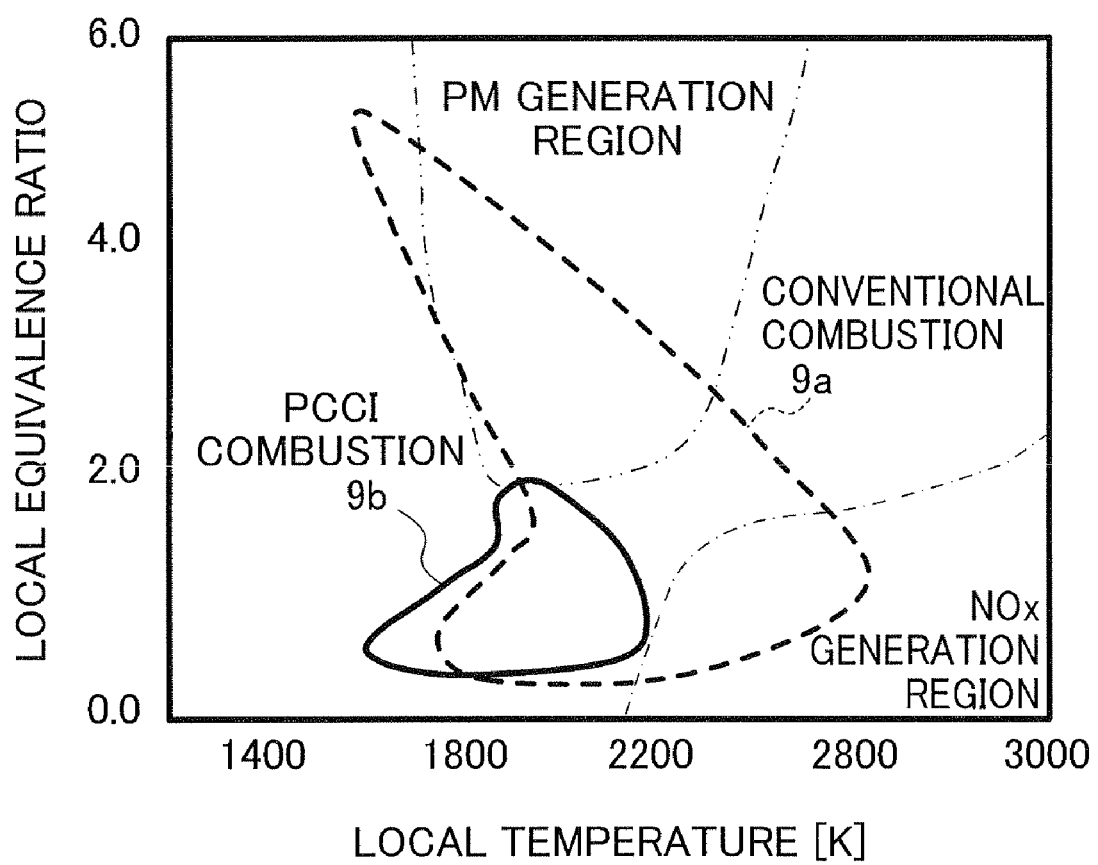
FIG. 9 is a diagram illustrating regions of PM and NOx generation in relation to local temperatures and local equivalence ratios.

FIG. 8 is a graph illustrating PCCI combustible regions in relation to engine revolution speed and engine torque. In FIG. 8, the dashed line represents the PCCI combustion established region of the comparative example, the solid line represents the PCCI combustion established region of the example, and the alternating long and short dash line represents the PCCI combustion established region required on general operation.

In the comparative example, the PCCI combustion established region is limited to a low load operation region as shown in FIG. 8 since combustion becomes instantaneous, and noise and vibration increase in a moderate and high operating region.

On the other hand, in the example, combustion can be gradual while ignition retard is being shortened (refer to FIGS. 2 and 3), noise and vibration can be controlled (refer to FIG. 4), thermal efficiency can be maintained (refer to FIG. 5), and the amount of CO emissions and the amount of THC emissions can be reduced (refer to FIGS. 6 and 7), by adding hydrogen during ATDC injection.

As described above, although ATDC injection should be conducted in a moderate and high operating region in PCCI combustion, the PCCI combustion established region can be expanded to the extent of a moderate and high operating region including a normal operating, region as shown in FIG. 8, by adding hydrogen to mix in this way.

As described in detail above, according to the present invention, the main fuel is combusted based under the premixed charge compression ignition combustion conditions while reformed gas including hydrogen is being supplied to the intake air of the engine 1. In this case, while the fuel injection timing and the main fuel injection period are being controlled based on the premixed charge compression ignition combustion condition of the engine 1, the fuel injection timing and the fuel injection period of reformed gas are controlled based on the premixed charge compression ignition combustion conditions of the engine 1.

Accordingly, even when ATDC injection is carried out, for example, combustion can be gradual while ignition retard is being shortened, and noise and vibration can be reduced. Therefore, as described above, combustion in a moderate and high load region can be improved, and the operating region can be expanded. In addition, the amount of unburnt HC and CO emissions can be reduced. Therefore, the exhaust emissions and the consumption of main fuel can be further improved.

In addition, the main fuel is reformed to generate reformed gas including hydrogen, and then this reformed gas is supplied to the intake air of the engine 1. That is, a hydrogen tank and the like for storing hydrogen do not need to be newly provided. In addition, in this way, it is possible to continuously supply hydrogen with stability.

Furthermore, the fuel injection timing and the fuel injection period of the main fuel and reformed gas can be controlled accurately by injecting the main fuel and reformed gas with the fuel injector 22 and the gas injector 32, respectively. In particular, in order to establish stable combustion in the engine 1, which is of premixed charge compression ignition type, it is necessary to accurately control the fuel injection timing and the fuel injection period of the main fuel and reformed gas.

In addition, reformed gas containing hydrogen is generated by one kind of reaction selected from the group consisting of a steam reforming process, a partial oxidation process, a carbon dioxide reforming process, and an auto-thermal process in which the steam reforming process and the partial oxidation process are combined, so that hydrogen can be generated stably.

Furthermore, reformed gas containing hydrogen is generated by a reforming reaction under an atmosphere of air, oxygen-enriched air, nitrogen-enriched air, oxygen, nitrogen, carbon dioxide, and water vapor, so that hydrogen can be generated stably.

The present invention is not limited to the above-mentioned embodiments, and can be modified in various ways.

In the above-mentioned embodiment, the main fuel is reformed by way of the fuel reformer 31 to generate reformed gas containing hydrogen and then add this reformed gas to the intake air, so as to add hydrogen to the intake air of the engine 1; however, the present invention is not limited thereto. For example, a hydrogen tank for storing previously purified hydrogen may be provided, from which the hydrogen may be added.

In addition, it is also possible to apply the present invention to a control device of a marine propulsion engine and the like such as an outboard motor in which a crankshaft is made to be in a vertical direction.

What is claimed is:

1. A control device for a premixed charge compression ignition internal combustion engine having a crankshaft, the engine using light oil or a composite fuel of light oil and other fuels as main fuel and conducting compression ignition of the main fuel in a combustion chamber, comprising:
a fuel supply means for supplying the main fuel to the engine;
a hydrogen supply means for supplying a gas containing hydrogen to the engine;
a fuel supply control means for controlling a main fuel injection timing and a main fuel injection period via the fuel supply means a hydrogen supply control means for controlling a supply timing and a supply period of gas containing hydrogen by way of the hydrogen supply means; and a crank angle position sensor which detects a rotation angle of the crankshaft and supplies a signal of the detected rotation angle to the fuel supply control means and the hydrogen supply control means, wherein the fuel supply control means controls the main fuel injection timing and the main fuel injection period in accordance with the signal of the detected rotation angle that is supplied by the crank angle position sensor, based on a premixed charge compression ignition combustion condition of the engine, and wherein the hydrogen supply control means controls the gas containing hydrogen injection timing and the gas containing hydrogen injection period in accordance with the signal of the detected rotation angle that is supplied by the crank angle position sensor, based on the premixed charge compression ignition combustion condition of the engine, wherein the fuel supply control means retards the main fuel injection timing from top dead center of the engine in a case of the engine being in a moderate and high operating region, and wherein the hydrogen supply control means controls the supply amount of the gas so that a hydrogen concentration of intake air of the engine becomes higher than a flammability limit in concert with when the main fuel injection timing is retarded by the fuel supply control means.

2. The control device for the internal combustion engine according to claim 1, wherein the hydrogen supply means comprises a reformed gas generation means for reforming the main fuel to generate the gas containing hydrogen.

3. The control device for the internal combustion engine according to claim 1 or 2, wherein the fuel supply means comprises a fuel injector that injects the main fuel into the engine, and the hydrogen supply means comprises a gas injector that injects the gas containing hydrogen into the intake air of the engine.

4. The control device for the internal combustion engine according to claim 2, wherein the reformed gas generation means generates the gas containing hydrogen by one kind of reaction selected from the group consisting of a steam reforming process, a partial oxidation process, a carbon dioxide reforming process, and an auto-thermal process in which the steam reforming process and the partial oxidation process are combined.

5. The control device for the internal combustion engine according to claim 2 or 4, wherein the reforming reaction of the main fuel by the reformed gas generation means is performed under an atmosphere of air, oxygen-enriched air, nitrogen-enriched air, oxygen, nitrogen, carbon dioxide, and water vapor.

* * * * *